United States Patent [19]

Goodman

[11] 4,094,582

[45] June 13, 1978

[54] LIQUID CRYSTAL MATRIX DISPLAY DEVICE WITH TRANSISTORS

[75] Inventor: Lawrence Alan Goodman, East Windsor, N.J.

[73] Assignee: RCA Corporation, New York, N.Y.

[21] Appl. No.: 733,168

[22] Filed: Oct. 18, 1976

[51] Int. Cl.² .................. G02F 1/16; G08B 23/00; H03K 17/60; H01L 29/78

[52] U.S. Cl. .................... 350/333; 307/251; 340/324 M; 357/23; 357/41

[58] Field of Search ............ 350/160 LC; 340/324 R, 340/324 M, 336; 307/38, 251; 315/169 TV; 357/4, 23, 41

[56] References Cited

U.S. PATENT DOCUMENTS

| | | | |
|---|---|---|---|
| 3,519,330 | 7/1970 | Heilmeier | 350/160 LC |
| 3,551,689 | 12/1970 | Zanoni | 307/38 |
| 3,564,135 | 2/1971 | Weimer | 315/169 TV |
| 3,765,747 | 10/1973 | Pankratz | 350/160 LC |
| 3,824,003 | 7/1974 | Koda | 350/160 LC |
| 3,896,318 | 7/1975 | Mitsui | 350/160 LC |
| 3,981,559 | 9/1976 | Channin | 350/160 LC |
| 4,006,383 | 2/1977 | Luo | 315/169 TV |
| 4,024,626 | 5/1977 | Leupp | 357/41 |

OTHER PUBLICATIONS

Sobel, "Approaches to Flat-Panel TV Displays"; SID 1976 Seminar Notes; UCLA, May 3 & 7, 1976, pp. 1 & 2.

Lipton, "A Fully Integrated MOS Liquid Crystal Video-Rate Matrix Display"; SID 77 Digest; Apr. 19, 1977, pp. 64 & 65.

*Primary Examiner*—Samuel W. Engle
*Assistant Examiner*—Donald P. Walsh
*Attorney, Agent, or Firm*—H. Christoffersen; Birgit E. Morris

[57] ABSTRACT

A field-effect transistor, made with liquid crystal material, is connected to each liquid crystal cell in a liquid crystal matrix display device. The transistors with the display, all made with liquid crystal material, are integrally constructed in one device.

7 Claims, 10 Drawing Figures

LIQUID CRYSTAL MATRIX DISPLAY DEVICE WITH TRANSISTORS

BACKGROUND OF THE INVENTION

This invention relates to liquid crystal devices, and in particular to liquid crystal displays of the "coincidence addressed" type.

Liquid crystal displays generally comprise a pair of oppositely disposed, spaced apart substrates, a liquid crystal material sandwiched between the substrates, and electrodes on the inside of facing surfaces of the substrates. By "coincidence addressed" is meant that the electrodes are generally in the form of a matrix comprising, for example, a first set of a plurality of parallel, spaced apart elongated conductors on one substrate and a second set of a plurality of parallel, spaced apart elongated conductors on the other substrate and extending orthogonal to the conductors of the first set. Thus the various conductors of one set cross or intersect, without touching, the various conductors of the other set. Thus, by applying a voltage to a selected one of the first set of conductors and a voltage to a selected one of the second set of conductors, a portion of the liquid crystal material between the two selected conductors at the intersection thereof is "activated" (i.e., the light transmitting characteristics thereof are changed) by the presence of the coincident voltages appearing across the intersection. By activating various combinations of selected ones of the liquid crystal portions, referred to as display elements, various optical images can be provided.

Coincident addressing display systems are generally known, and a known requirement of such systems is that in order to avoid such problems as unintended activation of elements not intentionally addressed, each element of the matrix should be electrically unidirectional, e.g., a matrix consisting of light emitting diodes. Known liquid crystal materials, however, are electrically symmetrical, i.e., they have the same electrical characteristics for either polarity of voltage applied thereacross. Thus a liquid crystal display matrix requires the addition of circuit elements, e.g., a diode at each element, to provide such directionality. (See: for example, "Studio Sperimentale del Comportamento Di Strati Di Semicondutlore In Contatto Con Strati Di Cristalo Liquido" by P. Maltese and C. M. Ottavi, *Alta Frequenza*, V. 44, #12, pp. 727–730 (Dec. 1975). Such liquid crystal diodes suffer the disadvantage in that they cannot operate at high speeds, such as that required for operation of T. V. Thus, they are limited to devices displaying information at low speeds. One solution is the use of a transistor at each display element. See U.S. Pat. No. 3,824,003 on the use of a field-effect transistor connected to each display element of the matrix for use in matrix display panel operating at T. V. rates. However, this method requires a multilayered structure.

SUMMARY OF THE INVENTION

A liquid crystal display device has a first set of a plurality of elongated parallel spaced apart electrodes, and a second set of a plurality of spaced apart electrodes coplanar with the first set of electrodes. A third set of a plurality of elongated, spaced parallel electrodes are in a plane spaced from that of the first and second electrodes. The third set of electrodes extends substantially perpendicular to the first set of electrodes with each of the third electrodes being opposite to at least one of the second electrodes. A liquid crystal material is between the second set of electrodes and the third set of electrodes. Between each of the second set of electrodes and the first set of electrodes is means forming a liquid crystal transistor.

DETAILED DESCRIPTION OF THE DRAWINGS

Figure 1:
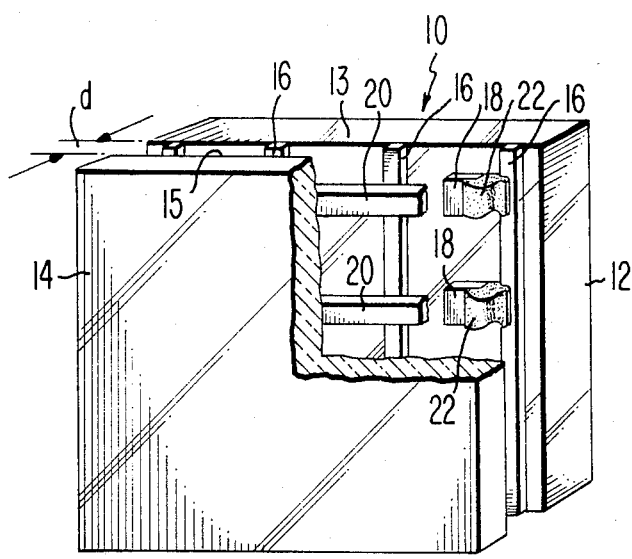
FIG. 1 is a view in perspective, partly cut away, of one form of a liquid crystal display device in accordance with this invention.
Figure 2:
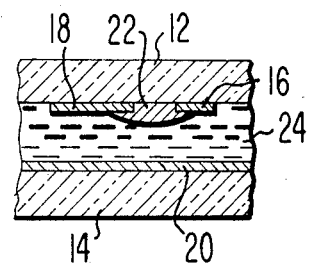
FIG. 2 is a cross-sectional view of a portion of the display device of FIG. 1.

Referring to FIG. 1, one form of the liquid crystal device of the present invention is generally designated as 10. The liquid crystal device 10 comprises back and front transparent glass support plates 12 and 14, respectively. The two plates 12 and 14 have essentially parallel, opposed, inner surfaces 13 and 15, respectively, that are separated by a distance $d$, which is generally in the range of about 3–30 micrometers. On the inner surface 13 of the back plate 12 is a first set of spaced conductive electrodes 16 and a second set of spaced conductive electrodes 18. The first set of electrodes 16 are elongated strips which extend in parallel relation in one direction across the plate 12. The second set of electrodes 18 are individual pads which are arranged in rows between the first set of electrodes 16 with the electrodes 18 of each row being adjacent to but spaced from a separate one of the first set of electrodes 16. The second set of electrodes 18 are not only arranged in rows parallel to the first set of electrodes 16 but also in rows transversely to the first set of electrodes. On the inner face 15 of the front plate 14 is a third set of spaced transparent conductive electrodes 20. The third set of electrodes 20 are elongated strips which extend in parallel relation substantially perpendicular to the first set of electrodes 16. Each of the electrodes 20 of the third set extends across a separate transverse row of the second set of electrodes 18.

A separate body 22 of a semiconductor material extends between and contacts each of the electrodes 18 of the second set and its adjacent electrode 16 of the first set. Each of the semiconductor bodies 22 is behind an electrode 20 of the third set. Each semiconductor material body 22 is preferably transparent (and thus preferably quite thin, e.g., in the order of 5,000–50,000Å) and has a relatively low bulk resistivity when in thermal equilibrium on the order of between about $10^3$ to $10^7$ ohm-cm. and is relatively insensitive to visible light. For example, known semiconductor materials such as zinc oxide, tin oxide, zinc sulfide and the like can be used for the body 22. The space between the back plate 12 and the front plate 14 is filled with a liquid crystal material 24 known type.

Figure 3:
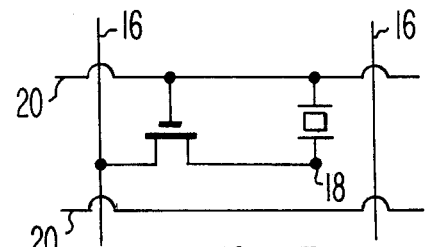
FIG. 3 is a circuit schematic of a typical matrix element of the display device of FIG. 1.

Each of the electrodes 18 of the second set along with the contacting semiconductor body 22, the adjacent electrode 16 of the first set and the adjacent electrode 20 of the third set forms a liquid crystal display element and a liquid crystal transistor connected to the display element. A more complete discussion of the liquid crystal transistor and display elements is found in my copending application, Ser. No. 733,446, filed Oct. 18, 1976, entitled "Transistor Using Liquid Crystal" which is incorporated herein by reference. These liquid crystal display elements and transistor combinations are arranged in rows and columns and are connected in an $x$-$y$ matrix by the first set of electrodes 16 and the third set of electrodes 20. This is shown schematically in FIG. 3. As described in my copending application, Ser. No. 733,446, each liquid crystal transistor is an FET type transistor in which the electrode 20 of the third set acts as the gate, the electrode 16 of the first set is the source and the electrode 18 of the second set is the drain. The electrodes 18 of the second set and the electrodes 20 of the third set also are the opposed electrodes of the liquid crystal display element. Thus, as shown in FIG. 3, one electrode 18 of the display element is electrically connected to one electrode 16 of the first set through the liquid crystal transistor and the other electrode of the display element is an electrode 20 of the third set. Since the electrodes 16 and 20 are the electrodes of the $x$-$y$ matrix, the liquid crystal display elements are arranged in an array and are connected across the $x$-$y$ matrix electrodes.

Figure 4:
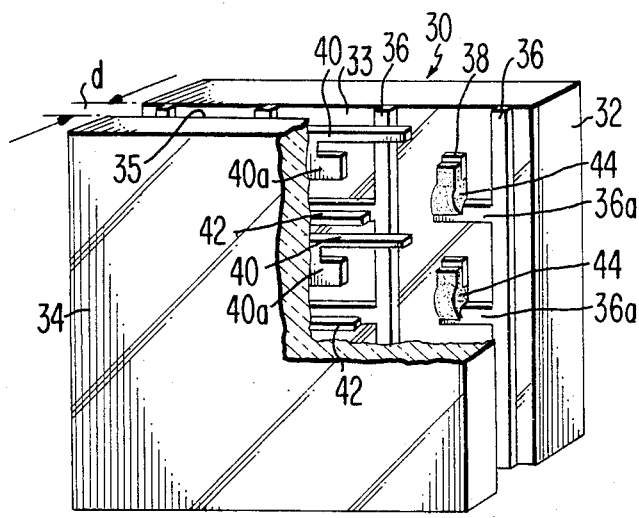
FIG. 4 is a view in perspective, partly cut away, of another form of the liquid crystal display device in accordance with this invention.
Figure 5:
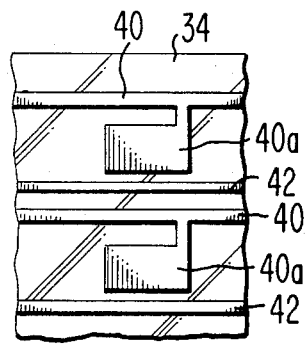
FIG. 5 is a plane view of a portion of the inner surface of a support plate of the display device of FIG. 4.
Figure 6:
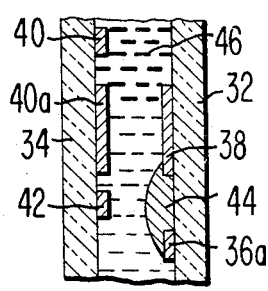
FIG. 6 is a cross-sectional view of a portion of the display device of FIG. 4.

Referring to FIG. 4, another form of the liquid crystal display device of the present invention is generally designated as 30. The liquid crystal device 30 comprises back and front transparent glass support plates 32 and 34, respectively. The two plates 32 and 34 have essentially parallel, opposed, inner surfaces 33 and 35, respectively, that are separated by a distance d, which is generally in the range of about 3–30 micrometers. On the inner face 33 of the back plate 32 is a first set of spaced conductive electrodes 36 and a second set of spaced conductive electrodes 38. The first set of electrodes are elongated strips which extend in parallel relation across the plate 32. Each electrode 36 has a plurality of spaced parallel arms 36a extending perpendicularly therefrom. The second set of electrodes 38 are individual pads which are arranged in rows between the first set of electrodes 36 with each second electrode 38 being adjacent to an arm 36a of the first electrode 36. On the inner face 35 of the first plate 34 is a third set of spaced transparent conductive electrodes 40. The electrodes of the third set of electrodes 40 are elongated strips which extend in parallel relation substantially perpendicular to the longitudinal direction of the first set of conductive electrodes 36. As shown in FIG. 4, each of the third electrodes 40 includes a plurality of spaced pads 40a connected thereto. Each of the pads 40a is directly opposite a separate one of the second electrodes 38. Also on the inner face 35 of the front plate 34 is a fourth set of spaced conductive electrodes 42. The fourth set of electrodes 42 are elongated stripes which extend parallel to the third set of electrodes 40 with each of the fourth electrodes 42 being between two of the third electrodes 40. Each of the fourth electrodes 42 extends opposite the space between the second electrodes 38 and the adjacent arm 36a of a first electrode 36.

A separate body 44 of a semiconductor material extends between and contacts each of the second electrodes 38 and the adjacent arm 36a of a first electrode 36. Each semiconductor material body 44 is preferably transparent (and thus preferably quite thin, e.g. in the order of 5,000–50,000Å) and has a relatively low bulk resistivity when in thermal equilibrium on the order of between about $10^3$ and $10^7$ ohm-cm and is relatively insensitive to visible light. For example, known semiconductor materials such as zinc oxide, tin oxide, zinc sulfide and the like can be used for the body 44. The space between the back plate 32 and the front plate 34 is filled with a liquid crystal material 46 of known type.

Figure 7:
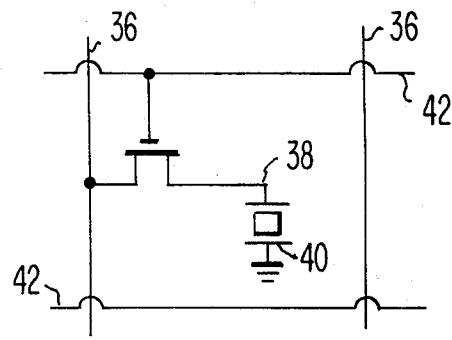
FIG. 7 is a circuit schematic of a typical matrix element of the display device of FIG. 4.

Each of the second set electrodes 38 and its opposed pad 40a of a third set of electrodes 40 forms with the liquid crystal material 46 therebetween a liquid crystal display matrix element. At each display matrix element is a liquid crystal transistor formed by a first set of electrodes 36, a second set of electrodes 38, a fourth set of electrodes 42 and a semiconductor material body 44. As shown in FIG. 7, the gate of the liquid crystal transistor is the fourth set electrode 42; the source is the first set electrode 36; and the drain is the second set electrode 38. The display matrix element is electrically connected between the drain of the liquid crystal transistor and ground. To address a particular display matrix element of the display device 30, a voltage is applied to the gate along an electrode from the fourth set electrodes 42 and a voltage is applied to the source along an electrode from the first set electrodes 36. The voltage applied to the gate turns on the liquid crystal transistor so that the voltage applied to the source is then applied to one side of the display matrix. The potential applied across the display matrix element turns the element on.

Figure 8:
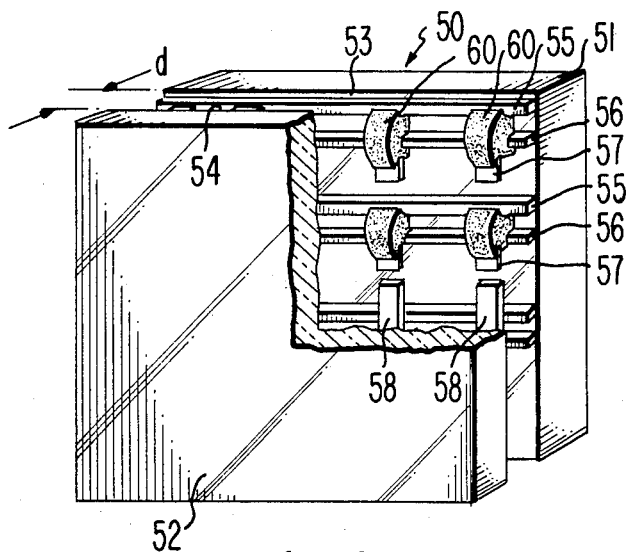
FIG. 8 is a view in perspective, partly cut away, of still another form of the liquid crystal display device in accordance with the present invention.
Figure 9:
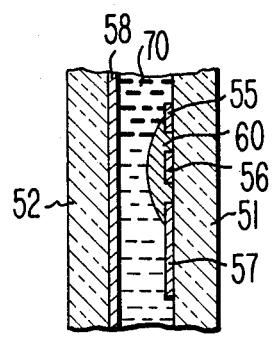
FIG. 9 is a cross-sectional view of a portion of the display device of FIG. 8.

FIG. 8 shows still another liquid crystal matrix display device 50. The display device 50 comprises back and front transparent glass support plates 51 and 52, respectively. The two plates 51 and 52 have essentially parallel, opposed inner surfaces 53 and 54, respectively, that are separated by a distance $d$, which is generally in the range of about 3–30 micrometers. On the inner surface 53 of the back plate 51 is a first set of spaced conductive electrodes 55; a second set of spaced conductive electrodes 56; and a third set of spaced conductive electrodes 57. The first set of electrodes 55 are elongated strips which extend in parallel relation in one direction across the back plate 51. The second set of electrodes 56 are elongated strips which extend parallel to the first set of electrodes 55 which each of the second electrodes 56 being between two of the first electrodes 55 and adjacent to a separate one of the first electrodes 55. The third set of electrodes 57 are individual pads which are positioned between one of the second electrodes 56 and one of the first electrodes 55. The third electrodes 57 are arranged in rows parallel to the first and second electrodes 55 and 56 and in columns perpendicular to the first and second electrodes 55 and 56. On the inner face 54 of the front plate 52 is a fourth set of spaced transparent conductive electrodes 58. The fourth electrodes 58 are parallel elongated strips extending substantially perpendicular to the longitudinal direction of the first and second electrodes 55 and 56. Each of the fourth electrodes 58 is opposite a column of the third electrodes 57.

A separate body 60 of a semiconductor material extends between and contacts each of the third electrodes 57 and the adjacent first electrode 55. Each of the semiconductor bodies 60 extends over and contacts the second electrode 56 which is between the first and third electrodes 55 and 57 between which the semiconductor body 60 extends. Each semiconductor material body 60 is preferably transparent (and thus quite thin, e.g. in the order of 5,000-50,000A) and has a relatively low bulk resistivity when in thermal equilibrium on the order of between about $10^3$ and $10^7$ ohm-cm and is relatively insensitive to visible light. For example, known semiconductor materials such as zinc oxide, tin oxide and the like can be used for the body 60. The space between the back plate 51 and the front plate 52 is filled with a liquid crystal material 70 of known type.

Figure 10:
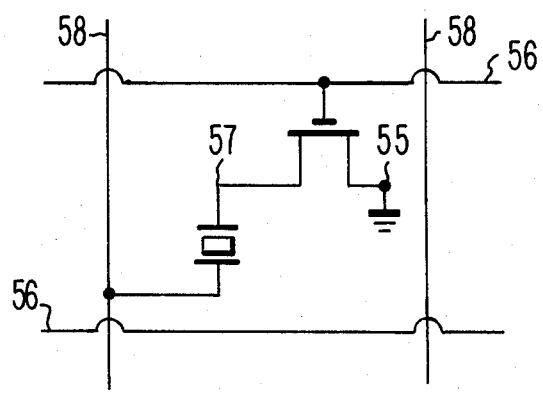
FIG. 10 is a circuit schematic of a typical matrix element of the display device of FIG. 8.

Each of the third set electrodes 57 and its opposing fourth set electrodes 58 forms with the liquid crystal material therebetween on liquid crystal display matrix element of the display device 50. At each display matrix element is a liquid crystal transistor formed by a first set electrode 55, a second set electrode 56, a third set electrode 57, and a fourth set electrode 58 of semiconductor material body 40. Schematically, this is shown in FIG. 10. Typically, the gate of the liquid crystal transistor is the second set electrode 56; the source is the third set electrode 57; and the drain is the first set electrode 55. Between the source and a fourth set electrode 58 is the display matrix element. The first set electrode 55 (the drain of the liquid crystal transistor) is typically connected to ground potential. To address a particular display matrix element of the display device 50, a voltage is applied to the gate along a second set electrode 56 and a voltage is applied to one side of the liquid crystal display element along a fourth set electrode 58. The voltage applied to the gate of the liquid crystal transistor turns the transistor on. This in turn creates a potential difference across the liquid crystal display element so that the display element is turned on.

The display device of the present invention has the advantage of simplicity of construction in that the transistors and the display elements are integrally constructed on one device. Thus the display devices require only the substrates, the electrodes and the liquid crystal. In each of the display devices shown, the number of electrodes in each of the sets will vary depending on the number of display elements and connected liquid crystal transistors desired.

I claim:

1. A liquid crystal display device comprising
   a first set of a plurality of elongated, spaced, parallel electrodes,
   a second set of a plurality of spaced electrodes coplanar with said first set of electrodes,
   a third set of a plurality of elongated, spaced parallel electrodes in a plane spaced from that of the first and second electrodes, the third set of electrodes extending substantially perpendicular to said first set of electrodes, with each of said third electrodes being opposite to at least one of the second electrodes,
   a liquid crystal material between the second set of electrodes and the third set of electrodes, and
   semiconducting material extending between and contacting each of the second electrodes and a first electrode and wherein the liquid crystal material extends across and contacts the semiconductor material forming a transistor.

2. A liquid crystal display device in accordance with claim 1 including a pair of spaced substrates with one substrate being on a surface substantially parallel to and opposed to a surface of the other substrate, the first and second electrodes are on the opposed surface of one of the substrates and the third set of electrodes are on the opposed surface of the other substrate.

3. A liquid crystal display device in accordance with claim 2 in which the second set of electrodes are pads arranged in rows between and parallel to the first electrodes and in rows perpendicular to the first electrodes.

4. A liquid crystal display device in accordance with claim 3 in which each of the third electrodes extends across the semiconductor bodies which are connected to the second electrodes which are oppposite to the respective third electrode.

5. A liquid crystal display device in accordance with claim 4 including a fourth set of elongated, spaced parallel electrodes on the opposed surface of the one substrate with each of the fourth electrodes extending between one of the first electrodes and a row of the second electrodes and each of the semiconductor bodies extends over and contacts a fourth electrode.

6. A liquid crystal display device in accordance with claim 3 including a fourth set of elongated spaced parallel electrodes on the opposed surface of the other substrate, each of said fourth electrodes extending between and parallel to two of the third electrodes and extending across a plurality of the semiconductor bodies.

7. A liquid crystal display device in accordance with claim 6 in which each of the first electrodes has a plurality of arms extending perpendicularly therefrom with each arm being adjacent to but spaced from a separate one of the second electrodes, and the semiconductor bodies extend between the second electrodes and the arms of the first electrodes.

* * * * *